Patented Aug. 4, 1931

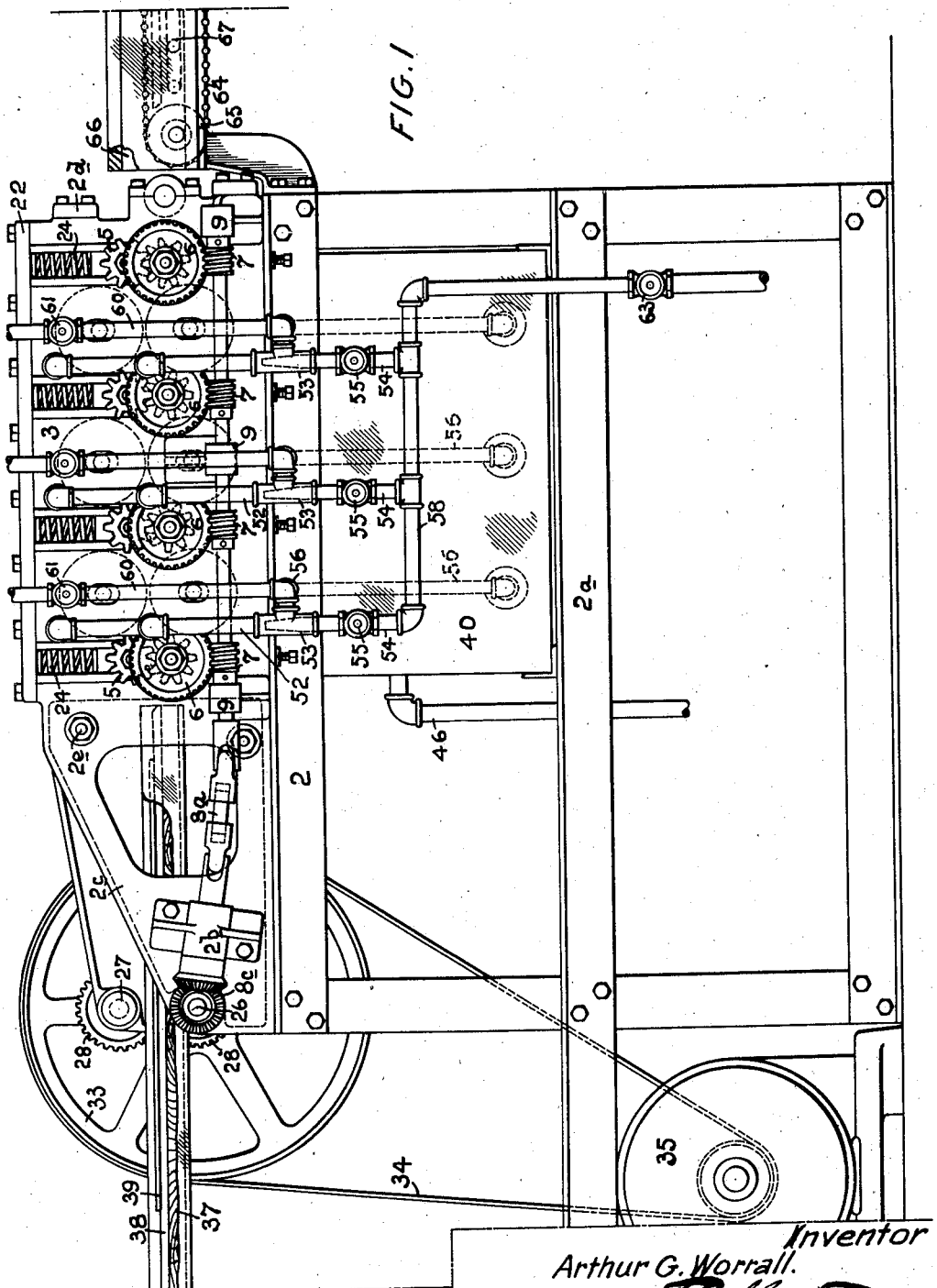

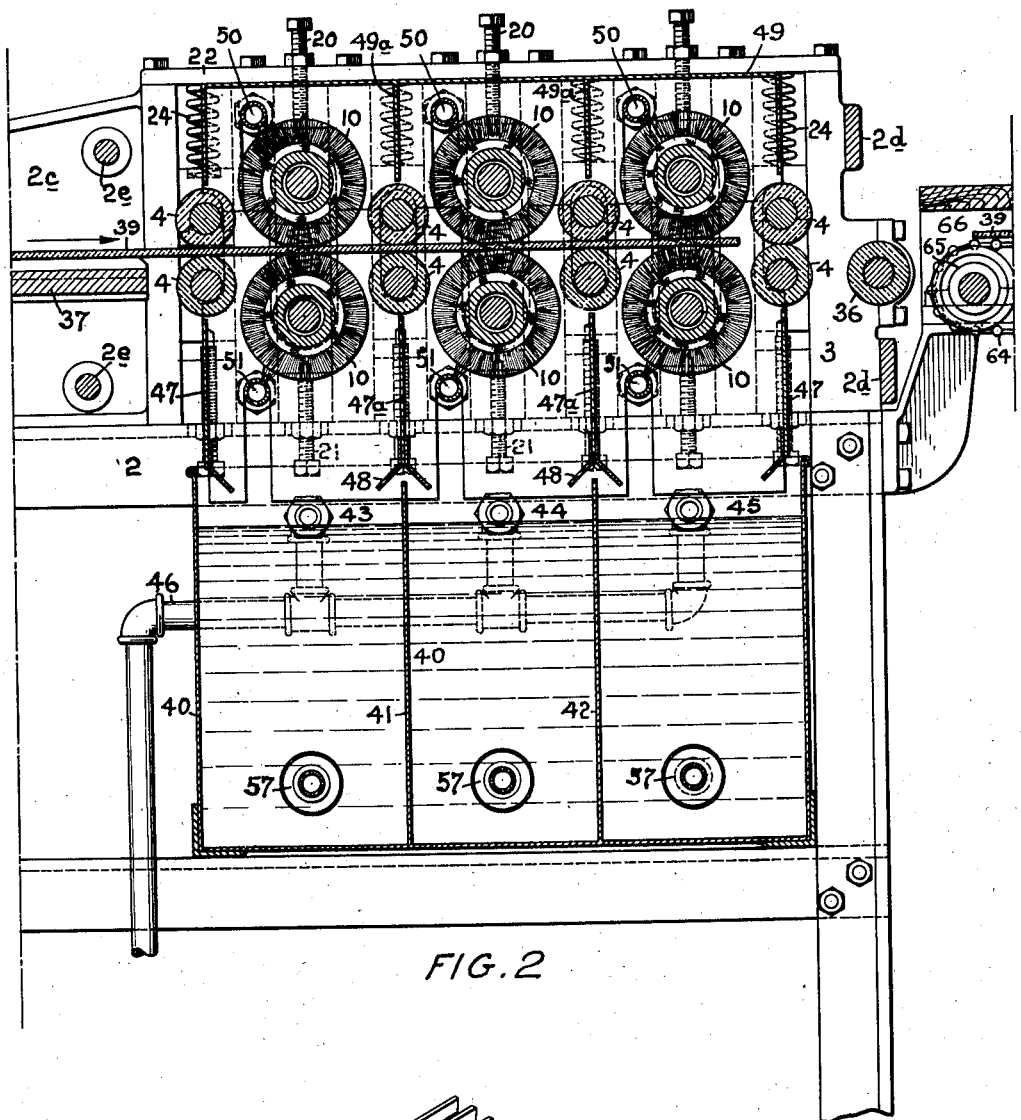
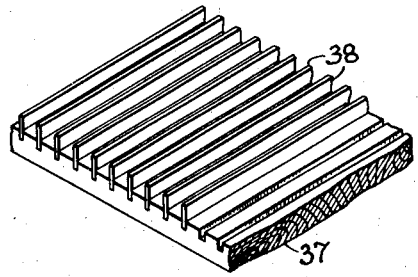

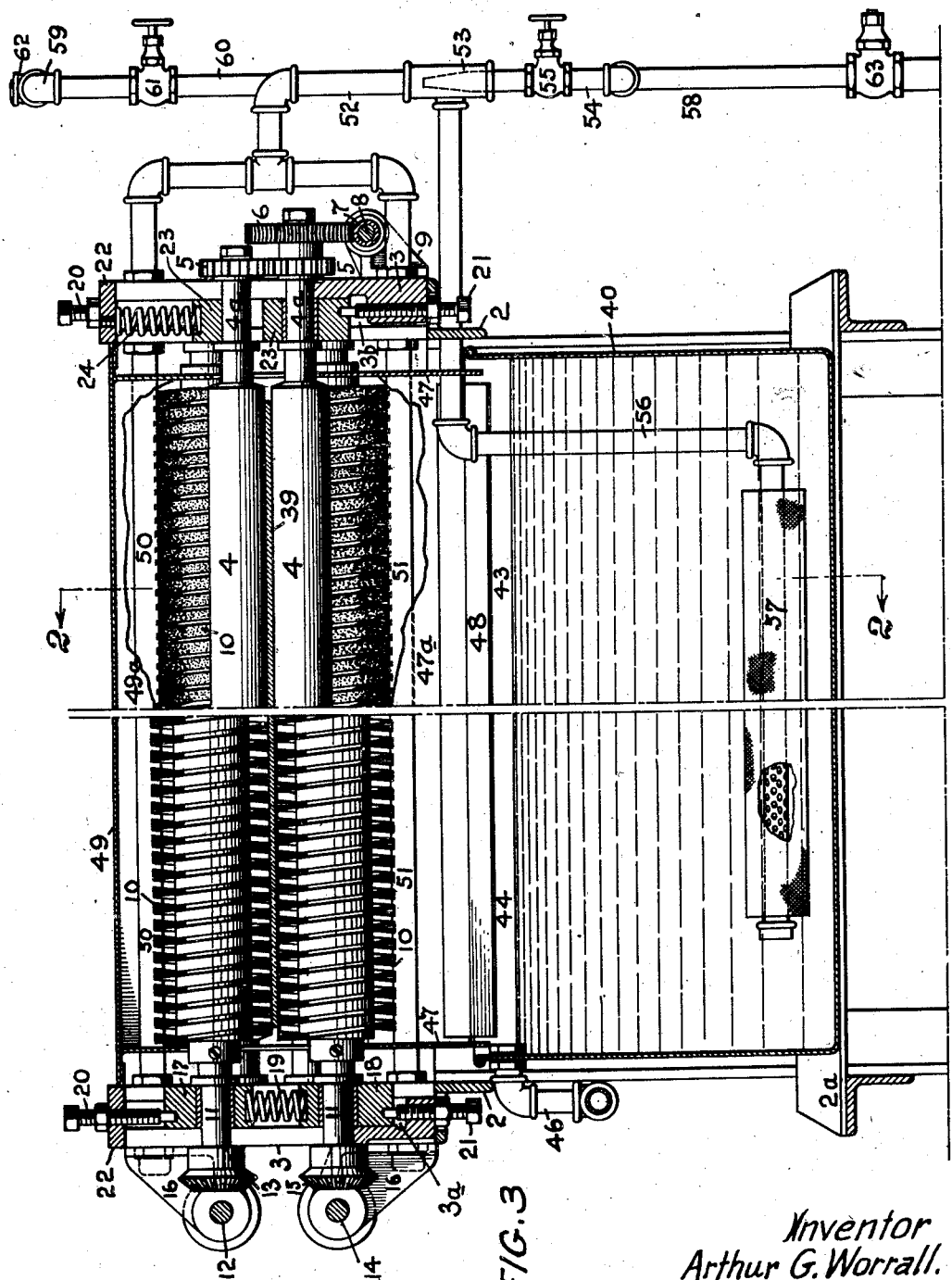

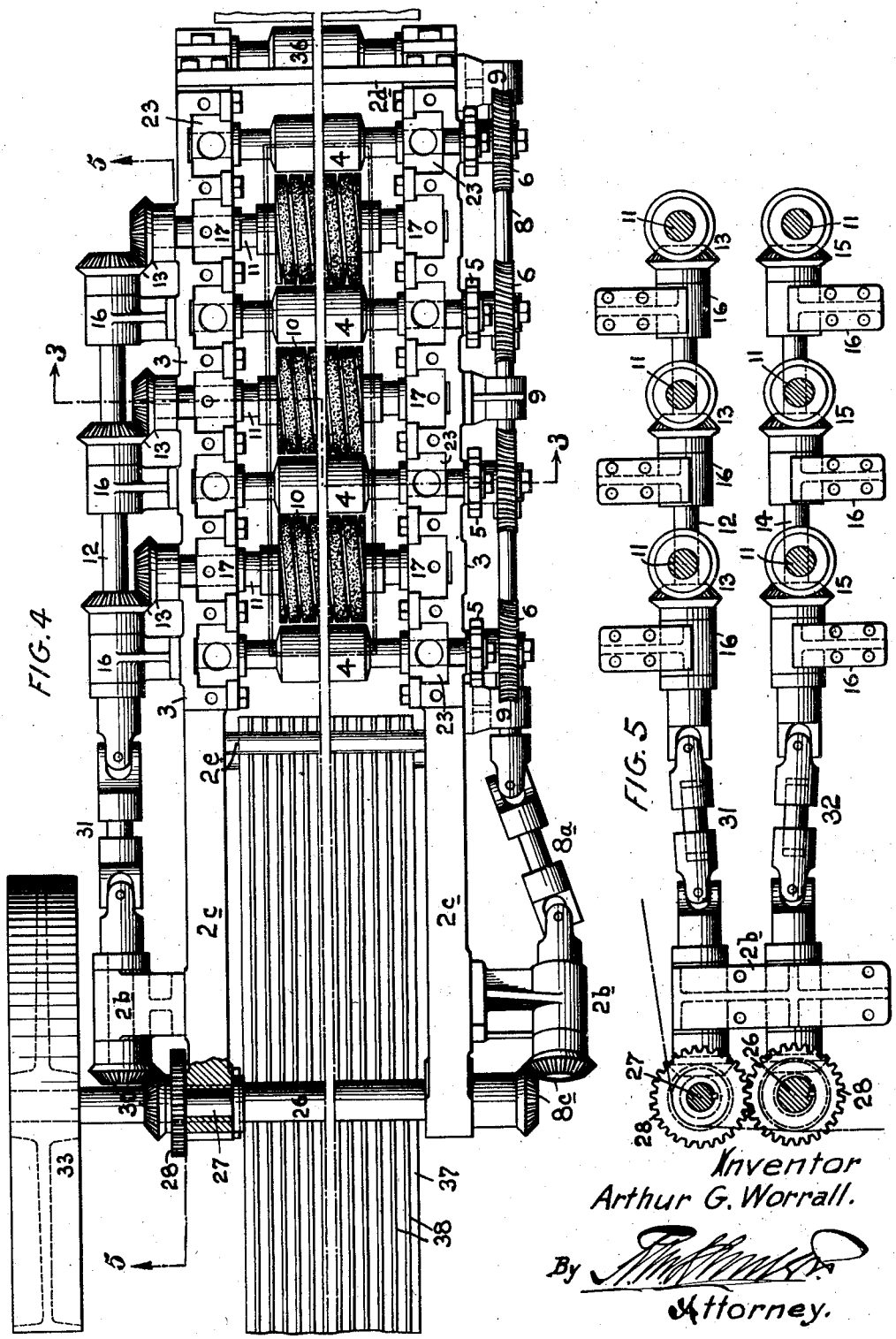

1,817,332

UNITED STATES PATENT OFFICE

ARTHUR G. WORRALL, OF PHILADELPHIA, PENNSYLVANIA, ASSIGNOR TO LOUIS J. KOLB, TRADING AS SAFETEE GLASS COMPANY, OF PHILADELPHIA, PENNSYLVANIA

GLASS WASHING MACHINE

Application filed June 27, 1928. Serial No. 288,581.

The object of the invention is to provide means which will thoroughly clean the surface of glass so that it is free from all grease, dirt, moisture or other soiling, whereby the surface condition of the glass is such that it insures a perfect surface union with celluloid or pyroxylin compounds or cements employed in the manufacture of laminated glass which comprises a plurality of sheets of glass secured to interposed sheets of celluloid or equivalent transparent substance.

In the manufacture of laminated glass it is essential that the surfaces of the glass sheets shall be thoroughly clean, not only for the transparency of the final product, but also to insure a thorough binding or welding of the interposed layers or sheets of celluloid and cementing layers between the celluloid and glass plates when employed, which cleanliness insures durability in the final product by reason of the fact that the said materials are thoroughly adherent to the glass with the exclusion of all air, gases, vapors or moisture.

The invention comprises a chamber provided with a plurality of sets of feeding rolls for positively feeding a glass sheet through the chamber associated with revolving brushes of cylindrical form arranged in pairs between the feeding rolls, said brushes supplied with water of desired temperature and preferably containing ammonia, whereby the surfaces of the glass sheet are successively subjected to washing or scrubbing by the brushes and squeezing by the pressure rolls which perform the dual function of feeding and squeegeeing the glass alternately in a rapid manner and so that the glass emerges in a cleansed and substantially dry condition.

A further feature of the improved cleansing operation comprises the treatment of the glass by the successive pairs of brushes within separate compartments, constituting the chamber, heated to different temperatures, said temperatures increasing from the intake to the delivery portions of the enclosing chamber and, at the same time, re-circulating the cleansing fluid from the respective compartments to their respective brushes, the means employed being such as to maintain the temperature conditions of the re-circulated fluid substantially constant whereby the first cleansing action upon the glass may be performed with cleansing fluid of a temperature of approximately 120° F., the second treatment being performed with the cleansing fluid at a temperature of approximately 160° F., and the third treatment of the glass being accomplished with the cleansing fluid at a temperature of approximately 200° F., it being understood, however, that these temperatures may be varied as desired.

My invention also consists of other features of improvement hereinafter described wherein the above objects and results are attained, said improvements comprising certain organization and combination of parts which are fully described hereinafter and more particularly defined in the claims.

Referring to the drawings: Fig. 1 is a side elevation of my improved apparatus; Fig. 2 is a longitudinal sectional view through the same, taken on line 2—2 of Fig. 3; Fig. 3 is a transverse sectional view taken on line 3—3 of Fig. 4; Fig. 4 is a plan view of the main portion of my improved machine; Fig. 5 is a vertical section taken on line 5—5 of Fig. 4; and Fig. 6 is a perspective view of a portion of the feeding table.

2 represents a base frame, preferably built up of commercial rolled iron shapes and having an upper portion which supports the feed rolls and brush mechanism adapted to act upon the glass sheets and having a lower support 2a upon which the tank structures 40 used in connection with the feed roll and brush mechanism are arranged and by which it is supported.

Referring to the feed roll and brush mechanism, the same comprises two side frames 3 having extensions 2c at one end, said side frames being united by transverse bolts 2e and bars 2d and by their positive attachment to the upper side members of the base frame 2. The side frames 3 are provided with suitable vertical guide grooves 3a for the bearing boxes 17 and 18 for the shafts 11 carrying the brushes 10 and also with vertical grooves 3b for the bearing boxes 23 for the feed roll shafts 4a carrying the rubber rolls 4. There are preferably four sets of feed rolls 4 and three sets of brushes 10 and these are arranged intermediate of and alternate with the feed rolls 4. The bearing boxes 17 and 18 of the same groove 3a are separated yieldingly by coiled springs 19 and are adjusted toward each other by set screws 20 and 21 and the top and bottom of the frames 3. The upper ends of the grooves 3a and 3b open upwardly through the frames 3 and are closed by cap plates or bars 22 secured in place and through which the adjusting screws 20 for the brushes extend.

By the construction just described, it is manifest that each pair of brushes may be adjusted bodily in a vertical direction so as to accurately position them to insure the glass sheet passing between the brushes in proper alinement.

As the springs 19 maintain the bearing boxes 17 and 18 in contact with the respective adjusting screws 20 and 21, it will be readily seen that not only may the brushes be adjusted in pairs to some extent up and down, but the said brushes may be independently adjusted with respect to each other. The capacity thus provided will insure the extent of brush contact required upon the glass surfaces.

The brushes may be formed in any suitable manner, but I prefer to arrange the bristles in a spiral about the hub, as will be readily understood from the illustration of said brushes. The advantage of this spiral arrangement of the bristles arises from the fact that the action of the bristles upon the glass surface will be more continuous throughout the entire width of the glass, in view of the fact that the brushes are rotated approximately two hundred and fifty (250) revolutions per minute, while the glass is caused to travel between the brushes at a speed of approximately two and one-half (2½) feet per minute. The arrangement of the brushes in spiral form, taken in connection with their rapid rotation, gives to them the same effect as if they were reciprocated longitudinally while being rapidly rotated, thereby giving a double action, as it were, upon the glass surface, and hence a better cleansing result, the effect being a more rapid brushing in a longitudinal direction upon the glass than in the lateral direction.

Referring now to the feed rolls 4, the same are formed of rubber similar to wringer rolls. There are preferably four sets of these feed rolls, each set comprising two rolls one above the other and having their shafts 4a journaled in bearing boxes 23 which are guided in the vertical guide grooves 3b of the side frames 3.

The bearing boxes 23 normally rest in contact and the lower box is adjusted vertically by means of an adjusting screw 25. The upper box is yieldingly pressed downward by a coil spring 24. By these means, the feed rolls may be simultaneously adjusted to different vertical positions, as may be required, for alining them with the glass sheet being passed through the machine.

It will be observed that the lower roll is positively positioned by the screw 25 to properly receive the glass as it is fed forward from the feed table 37, whereas the upper roll is yieldingly pressed downward and will adapt itself to suit the thickness of the glass as it passes over the lower roll. The bite upon the glass by these rolls arranged in pairs is dependent upon the tension of the spring 24, and this is made just sufficient to enable the rolls to positively press upon the two faces of the glass with pressure sufficient to insure its travel between the brushes and to hold the glass against being moved faster with respect to the brushes than the predetermined speed required.

The shafts 4a of each pair of feed rolls are geared together at 5 so that they are positively driven in opposite directions and at the same speeds. The lowermost shaft 4a of each pair of rolls is provided with a worm wheel 6. 8 is a horizontal shaft journaled in bearings 9 on the side of the frame 3 and is arranged below the worm wheel 6 and said shaft is provided with worms 7 meshing with the worm wheel 6. By rotation of this shaft and worms, the four pairs of feed rolls are caused to operate in unison at the same speed.

Journaled in the extension portions 2c of the side frames is a transverse shaft 26, the same being provided with a belt wheel 33 which is rotated by means of an electric motor 35 through a suitable transmission belt 34. Any other manner of driving the shaft 26 may be employed, as preferred.

One end of the shaft 26 is geared to a universally jointed transmission shaft 8a by means of miter gears 8c, one of these gears being upon the shaft 26 and the other journaled in a bearing 2b. In this manner, the worm shaft 8 is rotated by the power shaft 26. The other end of the shaft 26 is geared by spur gearing 28 to a short shaft 27, said shaft 27 driving the miter gears 30 and, similarly, the corresponding end of the shaft 26 drives miter gears 29. Flexible or universally jointed transmission means 31 and 32 are respectively connected at one of their ends with one of the miter gears 30 and 29, and at the other of their ends with horizontal shafts 12 and 14. The shaft 12 is arranged to drive the upper brush shafts 11 through miter gears 13, and the lowermost shaft 14 is arranged to rotate or drive the lowermost shafts 11 of the brushes by means of miter gears 15. These shafts 12 and 14 are suitably supported in bearings 16 secured to the side frame 3. It will now be seen that all of the feed rolls and brushes are driven from the power shaft 26.

During the travel of the glass through the machine, it must be subjected to the cleansing action of a suitable liquid which, in the present case, may be a mixture of ammonia and water.

The temperature of the cleansing fluid which is employed in conjunction with the several pairs of brushes is so regulated that the cleansing solution employed with the first pair of brushes to act upon the glass in being fed through the machine is approximately 120° F. The water cleansing solution employed with the second set of brushes to act upon the glass is aproximately 160° F. Similarly, the temperature of the cleansing solution employed in connection with the third or last set of brushes is approximately 200° F. or a little below boiling.

It will be understood, however, that while I am referring to temperatures preferably used in practice and in connection with a washing machine employing three sets of brushes, I do not restrict myself to these temperatures nor to the number of sets of brushes, as both of these may be varied. For example, if there were four sets of brushes instead of three, the aproximate rise in temperature from 120° F. to 200° F. would be divided between the four sets of brushes instead of three, with the result that the difference in temperature from one set to the next would amount to about 26° instead of 40°, as indicated in the particular illustration of my invention.

Each pair of brushes is enclosed within a chamber of a built-up construction and extending between two sets of feed rolls 4. The cleansing fluid is sprayed upon the upper brush from a spray pipe 50 and upon the lower brush by a spray pipe 51, and the surplus of the water thus sprayed finds its way downward into the corresponding tank compartment from which it is again sprayed by suitable apparatus hereinafter described.

A lower tank 40 is supported upon the part 2a of the base frame 2 and said tank is provided with upright divisions 41 and 42 immediately below the two middle pairs of feed rolls 4. In this manner the tank 40 is divided into three compartments 43 and 44 and 45. This tank is also provided with an overflow or waste pipe which has receiving openings 46 in communication with the upper portions of the compartments 43, 44 and 45, and thereby permit any scum on the water escaping and, at the same time, maintaining the maximum level of the water in the tank.

In the lower portion of each of the tank compartments 43, 44 and 45 there is a suction pipe 57 from which the solution is ultimately fed to the spray pipes 50 and 51 arranged in connection with the brushes 10 immediately above the said tank compartments, whereby the contents thereof may be sprayed to the brushes and the surplus returned to the compartments, and so that the different cleansing fluids of the several compartments do not mix or commingle to any pronounced degree. In this manner, the temperature of the cleansing fluids in the several compartments and to be used with the respective pairs of brushes may be maintained as before pointed out at different degrees, the temperatures increasing from the intake end to the discharge end of the apparatus.

The particular means for causing this circulation of the cleansing fluid from each tank compartment to its corresponding spraying pipes comprises the screened suction pipe 57 in the bottom of the tank compartment, a supply pipe 56 leading therefrom to a steam ejector 53, and from said ejector the heated fluid is passed through a pipe 52 having branching portions connecting with the spray pipes 50 and 51.

The steam to the steam ejector is supplied from a steam pipe 54 and the supply of steam to the ejector is controlled by a valve 55.

As a means for supplying fluid to the tank, a pipe 60 having a valve 61 is arranged to connect with the pipe 56 so as to supply water or cleansing fluid to the tank, not only to provide make-up water, but to supply the tank with the necessary quantity of the cleansing fluid for normal use.

The circulating pipes above described as employed in connection with the tanks and the brushes may be connected to a common steam supply main 58 having a master control valve 63, and similarly, each of the cold water supply pipes may be connected to a common water main 59 for water or cleansing fluid, and this also is provided with a master valve 62.

During ordinary operation of the apparatus, the water or fluid control valves 61 and 62 are closed and the steam valves 55 and 63 are open, but the steam valves 55 are each adjusted to insure not only the proper circulation of the fluid through the spray pipes, but also the proper temperature of the fluid employed in each of the tank structures.

Referring again to the tank and enclosing chambers of the brushes, the same will be understood by reference to Fig. 2. Above the lower tank 40 is arranged a box structure 47 open at the top and bottom. This structure fits the space between the tank 40 and the shaft structures of the lower brushes and feeding rolls. It is provided with slotted portions to fit upward around the said parts so as to practically form end and side walls. The structure is, furthermore, divided by two partitions 47a which are in alinement with the partitions in the lower tank 40, but their lower parts are bifurcated to provide oppositely directed flanges for causing the downwardly flowing liquid to pass into the proper tank compartments. Arranged above the box structure 47 is a further box-like structure 49 constituting a lid which extends over the shaft structures of the upper feed rolls and brushes, and is also provided with two middle partitions 49a which are in the same alinement with the partitions 47a and 41 and 42 in the tank 40 before referred to. When these parts 47 and 49 are in position about the brushes and feed rolls, the spray pipes 50 and 51 extend through them, as shown, and the spray solution therefrom delivered to the brushes is kept within the confines of the respective enclosing chambers. In this manner, the cleansing fluids of different temperatures fed to the brushes are caused to descend into the proper tank compartments in the tank structure.

While the brushes distribute the cleansing fluid over the surface of the glass and scour it to a clean condition, the said solution must be removed from the glass so that it returns to its own proper compartment in the tank 40, and this is accomplished by the squeezing action of the rubber rolls 4 which thereby perform the function of feed rolls and squeegeeing means for practically drying the glass surface as it passes between said rolls.

The feed table for the glass and from which it is delivered into the washing machine may preferably consist of a transverse wooden table 37 having upwardly extending spaced narrow ribs 38 upon which the glass rests and over which it is easily shifted. These ribs, furthermore, act as guides to insure the glass being fed in substantial alinement with the feed rolls. When the glass is washed and leaves the last pair of feeding and squeezing rolls 4, it is guided over an idler roller 36 and is then delivered upon bead conveyor chains 64 passing about suitable driving and guide wheels 65, and thereby conveyed through a drying chamber 66 which may be heated by steam coils 67. The glass is indicated at 39 resting upon the bead conveyor. I do not restrict myself to this particular construction of the drier means.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details as the same are susceptible of modification in various particulars without departing from the spirit or scope of the invention.

Having now described my invention, what I claim and desire to secure by Letters Patent is:

1. A machine for washing glass and articles in sheet form, comprising a plurality of pairs of feed rolls of yielding material between which the glass may be successively fed forward while being subjected to the yielding pressure of said rolls, a pair of brushes arranged between each two adjacent pairs of feed rolls one of said brushes of each pair operating upon one surface of the glass and the other operating upon the other surface of the glass, means for feeding jets of separate bodies of fluid to the respective pairs of brushes, means for rotating the feed rolls at a low surface speed, means for rotating the brushes at a relatively high speed, means for recirculating the separate bodies of fluid to their respective brushes and glass sheet, a supporting frame for the brushes and fluid feeding means, and wherein further, the respective pairs of brushes are arranged in separate compartments and the means for supplying heated fluid to the brushes are arranged to discharge into the respective compartments for said pairs of brushes, and means for heating the fluid are provided to insure the fluids of each compartment being maintained at different temperatures whereby the glass is successively treated to fluids of increasing temperature.

2. The invention according to claim 1, wherein further, the respective pairs of brushes are arranged in separate compartments, the same consisting of a lower tank having vertical divisions, an upper or box-like cover structure having vertical divisions and closed at the top, and an intermediate box-like structure open at the top and bottom to fit between the tank and box-like cover structure and also provided with vertical divisions, the vertical divisions of the tank and several box-like structures being in substantial alinement.

3. A machine for washing glass and articles in sheet form, comprising a plurality of pairs of feed rolls of yielding material between which the glass may be successively fed forward, a pair of brushes arranged between each two adjacent pairs of feed rolls, one of said brushes of each pair operating upon one surface of the glass and the other operating upon the other surface of the glass, means for supplying a fluid to the brushes, means for rotating the feed rolls at a low surface speed, means for rotating the brushes at a relatively high speed, supporting bearings for the feed rolls comprising a vertically adjustable bearing for each of the lower feed rolls, and an adjustable supporting screw therefor, a downwardly acting bearing for each of the upper feed rolls, supporting means for the brushes and the means for feeding fluid thereto, and a continuously acting spring for forcing each of the said downwardly acting bearings downward, whereby the lower feed rolls may be supported definitely as to elevation and the upper feed rolls yieldingly pressed downward toward the lower feed rolls.

4. A machine for washing glass and articles in sheet form, comprising a plurality of pairs of feed rolls of yielding material between which the glass may be successively fed forward, a pair of brushes arranged between each two adjacent pairs of feed rolls, one of said brushes of each pair operating upon one surface of the glass and the other operating upon the other surface of the glass, means for supplying a fluid to the brushes, means for rotating the feed rolls at a low surface speed, means for rotating the brushes at a relatively high speed, supporting bearings for the brushes consisting of upper and lower vertically adjustable bearings respectively for the upper and lower brushes of each pair, adjusting screws for adjusting the lower bearings vertically upward, adjustable screws for adjusting the upper bearings vertically downward, supporting means for the brushes and means for supplying fluid thereto, and spring devices between the upper and lower bearings of each pair of brushes, whereby the brushes of each pair may be adjusted relatively to each other and also adjusted as a pair to different elevations.

In testimony of which invention, I hereunto set my hand.

ARTHUR G. WORRALL.